United States Patent
Foch et al.

(10) Patent No.: US 12,054,280 B2
(45) Date of Patent: Aug. 6, 2024

(54) AIRCRAFT COMPRISING AN ELECTRIC POWER DISTRIBUTION NETWORK

(71) Applicant: Airbus Operations SAS, Toulouse (FR)

(72) Inventors: Etienne Foch, Toulouse (FR); Franck Albero, Toulouse (FR); Sébastien Laclau, Toulouse (FR); Xavier Chasseriaud, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 288 days.

(21) Appl. No.: 17/725,654

(22) Filed: Apr. 21, 2022

(65) Prior Publication Data
US 2022/0348348 A1    Nov. 3, 2022

(30) Foreign Application Priority Data
Apr. 28, 2021    (FR) ..................... 2104394

(51) Int. Cl.
*B64D 41/00* (2006.01)
*H02B 1/20* (2006.01)

(52) U.S. Cl.
CPC ............ *B64D 41/00* (2013.01); *H02B 1/20* (2013.01); *B64D 2221/00* (2013.01)

(58) Field of Classification Search
CPC .... B64D 41/00; B64D 2221/00; B64D 47/00; H02B 1/20
See application file for complete search history.

(56) References Cited

U.S. PATENT DOCUMENTS

| | | | |
|---|---|---|---|
| 2010/0284117 A1* | 11/2010 | Crane | H02J 4/00 361/93.1 |
| 2014/0229038 A1 | 8/2014 | Boy et al. | |
| 2015/0266588 A1 | 9/2015 | Bulin et al. | |
| 2019/0039715 A1 | 2/2019 | Jacquemoud-Collet et al. | |

FOREIGN PATENT DOCUMENTS

| | | |
|---|---|---|
| EP | 1914162 A1 | 4/2008 |
| EP | 2431277 A2 | 3/2012 |
| EP | 2845806 A2 | 3/2015 |
| EP | 3565189 B1 | 6/2020 |

OTHER PUBLICATIONS

French Search Report; priority document.

* cited by examiner

*Primary Examiner* — Valentina Xavier
(74) *Attorney, Agent, or Firm* — Greer, Burns & Crain, Ltd.

(57) ABSTRACT

An aircraft including a first electrical distribution busbar and a second electrical distribution busbar extending at least in part in a fuselage of the aircraft, in a longitudinal direction of the fuselage. A first electric generator is connected to the distribution conductors of the first electrical distribution busbar via a first coupling switch directly connected to the first electric generator and to the distribution conductors of the first busbar. A second electric generator is connected to the distribution conductors of the second electrical distribution busbar via a second coupling switch directly connected to the second electric generator and to the distribution conductors of the second busbar. The first coupling switch and the second coupling switch are positioned in the aircraft independently of one another.

17 Claims, 6 Drawing Sheets

AIRCRAFT COMPRISING AN ELECTRIC POWER DISTRIBUTION NETWORK

CROSS-REFERENCES TO RELATED APPLICATIONS

This application claims the benefit of the French patent application No. 2104394 filed on Apr. 28, 2021, the entire disclosures of which are incorporated herein by way of reference.

FIELD OF THE INVENTION

The present invention relates to the field of supplying electric power to items of electrical equipment of an aircraft.

BACKGROUND OF THE INVENTION

Aircraft, in particular transport aircraft, comprise items of electrical equipment distributed through their fuselage. These items of electrical equipment must be supplied with electric power. For this purpose, aircraft usually comprise electric power cable harnesses. Electric power cable harnesses generally extend between an electrical core of the aircraft and the items of electrical equipment to be supplied with power. The electrical core is generally located at the front of the fuselage. It is supplied with electric power by electric generators driven by engines of the aircraft, generally located under the wings of the aircraft. For this purpose, electric power cables extend between the electrical core and the electric generators.

In modern aircraft, ever more functions are implemented electrically. As a result, ever more items of electrical equipment of the aircraft must be supplied with electric power. Consequently, the harnesses are more complex, bulkier and heavier than in former generations of aircraft. Implementing the harnesses is also more complex. Consequently, it is desirable to simplify the distribution of electrical energy in aircraft.

The patent EP3,565,189B2 in the name of the Applicant provides a solution to this problem. This patent discloses an aircraft comprising a plurality of busbars extending in the fuselage of the aircraft in a longitudinal direction of the fuselage, a plurality of electric generators, and also items of electrical equipment distributed through the fuselage. The aircraft further comprises a switching system, in particular an electrical core, connected to the electric generators and to the busbars. The items of electrical equipment distributed through the fuselage are connected to connection points of the busbars by means of local electrical connections. This solution makes it possible to simplify the distribution of electric power between the electrical core and the various items of electrical equipment located in the fuselage. However, it still requires electric power connections between the electric generators and the electrical core. Given that these connections must withstand large electric currents at the output of the electric generators, their electrical conductors must have a large cross-sectional area. Moreover, these connections extend over large distances in the aircraft since the electric generators are located near the engines, at the wings of the aircraft, and the electrical core is located at the front of the fuselage. As a result, these connections are heavy and bulky. It should be noted that, even if this patent anticipates that these connections between the electric generators and the electrical core can be integrated into busbars, these connections are then implemented by means of specific electrical conductors of the busbars, distinct from the electrical conductors provided for electrical distribution between the electrical core and the items of electrical equipment distributed through the fuselage. Consequently, even in such an embodiment, these connections are heavy and bulky.

SUMMARY OF THE INVENTION

The present invention aims, in particular, to provide a solution to this problem. It relates to an aircraft comprising:
a fuselage;
a set of items of electrical equipment distributed through the fuselage;
a set of electric generators including at least a first electric generator and a second electric generator; and
an electric power distribution network comprising a set of electrical distribution busbars including at least a first electrical distribution busbar and a second electrical distribution busbar, each of the electrical distribution busbars comprising electrical distribution conductors and extending at least in part in the fuselage, in a longitudinal direction of the fuselage,
wherein each of the items of electrical equipment in the set of items of electrical equipment is connected to the electrical distribution conductors of one busbar in the set of electrical distribution busbars.
The aircraft is noteworthy in that:
the first electric generator is connected to the distribution conductors of the first electrical distribution busbar via a first coupling switch, this first coupling switch being directly connected, on the one hand, to the first electric generator and, on the other hand, to the distribution conductors of the first busbar;
the second electric generator is connected to the distribution conductors of the second electrical distribution busbar via a second coupling switch, this second coupling switch being directly connected, on the one hand, to the second electric generator and, on the other hand, to the distribution conductors of the second busbar; and
the first coupling switch and the second coupling switch are positioned in the aircraft independently of one another.

Thus, the first electric generator is connected to the distribution conductors of the first electrical distribution busbar only via the first coupling switch. Likewise, the second electric generator is connected to the distribution conductors of the second electrical distribution busbar only via the second coupling switch. Given that the first coupling switch and the second coupling switch are positioned in the aircraft independently of one another, these two coupling switches do not form part of an electrical core of the aircraft. Consequently, it is not necessary for the connections between the electric generators and the distribution conductors of the busbars to extend between the wings of the aircraft and the front of the fuselage. This makes it possible to decrease the lengths of the connections and consequently to decrease their weight and their bulk. Thus, when a generator is associated with an engine located at a wing of the aircraft and the electrical distribution busbar corresponding to this generator extends only in the fuselage of the aircraft, this makes it possible to connect the generator to this busbar in a portion of the busbar located near the wing. Moreover, when the electrical distribution busbar further comprises a portion of the busbar extending in the wing of the aircraft (for example, so as to make it possible to link items of electrical equipment located in the wing to this busbar), this makes it possible to connect the generator to this busbar in a portion of the busbar located near the generator.

In one embodiment, the set of electric generators further comprises a third electric generator and a fourth electric generator, and the set of electrical distribution busbars comprises a third electrical distribution busbar and a fourth electrical distribution busbar, such that:

the third electric generator is connected to the distribution conductors of the third electrical distribution busbar via a third coupling switch, this third coupling switch being directly connected, on the one hand, to the third electric generator and, on the other hand, to the distribution conductors of the third busbar;

the fourth electric generator is connected to the distribution conductors of the fourth electrical distribution busbar via a fourth coupling switch, this fourth coupling switch being directly connected, on the one hand, to the fourth electric generator and, on the other hand, to the distribution conductors of the fourth busbar; and the third coupling switch and the fourth coupling switch are positioned in the aircraft independently of one another.

Advantageously, the coupling switch associated with an electric generator is dedicated to this electric generator.

In one embodiment, the coupling switch associated with an electric generator is positioned near the electric generator; in particular, this coupling switch is integrated with the electric generator.

In another embodiment, the coupling switch associated with an electric generator is positioned near the electrical distribution busbar to the conductors of which this electric generator is connected.

In one embodiment, the set of electric generators further comprises at least a first additional electric generator and this first additional electric generator is connected to the distribution conductors of the first electrical distribution busbar via a first additional coupling switch, this first additional coupling switch being directly connected, on the one hand, to the first additional electric generator and, on the other hand, to the distribution conductors of the first busbar.

Particularly, one out of the first electric generator and the first additional electric generator is current-controlled and the other out of the first electric generator and the first additional electric generator is voltage-controlled; or the first electric generator and the first additional electric generator are voltage-controlled.

In one particular embodiment, the electric generators in the set of electric generators are of the high-voltage direct current type.

In one embodiment, two electric generators connected to the distribution conductors of the same electrical distribution busbar are driven by the same engine of the aircraft.

In another embodiment, two electric generators connected to the distribution conductors of the same electrical distribution busbar are driven by distinct engines of the aircraft.

In one advantageous embodiment, the first electrical distribution busbar and the second electrical distribution busbar have segregated paths through the fuselage of the aircraft and the aircraft further comprises a connection between the first electrical distribution busbar and the second electrical distribution busbar, via an interconnecting contactor.

In one particular embodiment, the aircraft comprises at least one emergency electrical network supplied with power by an emergency electrical source and this at least one emergency electrical network is connected to the electrical distribution conductors of at least one of the electrical distribution busbars via a coupling contactor.

In one embodiment, the aircraft comprises an auxiliary electric generator of APU type and this auxiliary electric generator of APU type is connected to the electrical distribution conductors of at least one of the electrical distribution busbars via a coupling contactor.

The various aforementioned embodiments can be taken separately or in combination.

BRIEF DESCRIPTION OF THE DRAWINGS

The invention will be better understood upon reading the following description and studying the appended figures.

DETAILED DESCRIPTION OF THE PREFERRED EMBODIMENTS

Figure 1:
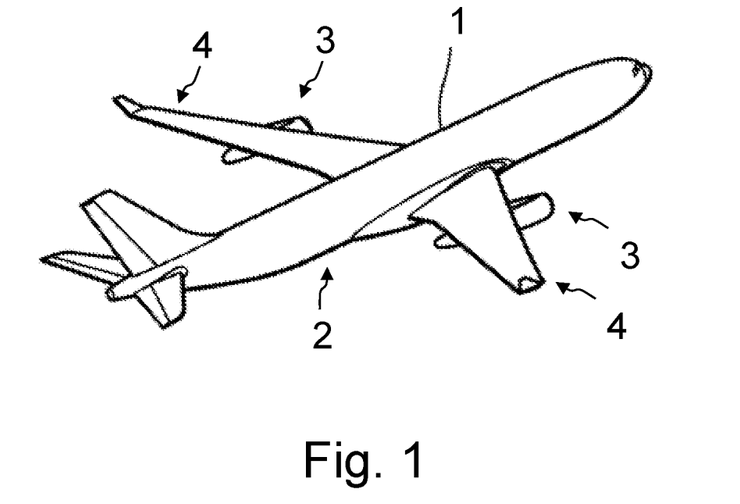
FIG. 1 illustrates an aircraft comprising an electric power distribution network, in accordance with one embodiment of the invention.
Figure 2:
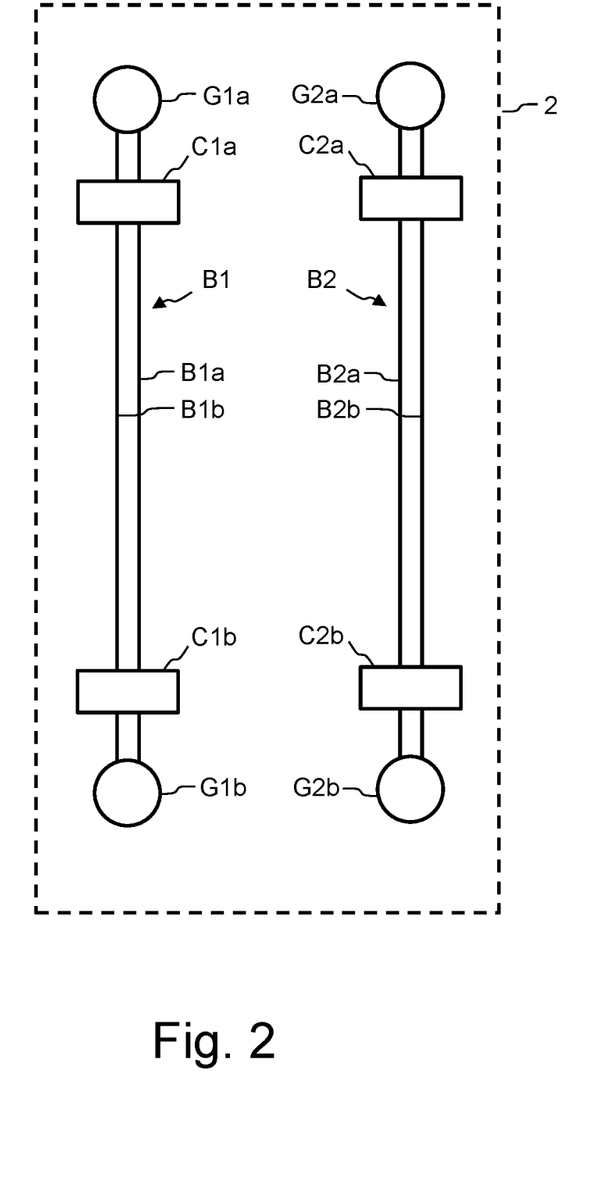
FIG. 2 schematically illustrates one embodiment of an electric power distribution network of an aircraft in accordance with one embodiment of the invention.

The aircraft 1 shown in FIG. 1 comprises a fuselage 2, wings 4, and also propulsion engines 3. In the embodiment illustrated in the figure, the propulsion engines 3 are attached to the wings 4. The aircraft comprises a set of busbars, including a first electrical distribution busbar B1 and a second electrical distribution busbar B2. These busbars extend at least in part in a longitudinal direction of the fuselage 2, as illustrated in FIG. 2. These busbars comprise electrical distribution conductors B1$a$, B1$b$ and B2$a$, B2$b$, respectively. In the embodiment illustrated in the figure, the busbars each comprise two electrical distribution conductors, thus corresponding to an electrical distribution network of bipolar type. However, this in no way limits the invention, which also applies to any multipolar (tripolar, quadripolar, etc.) electrical distribution network, the busbars then having a larger number of electrical distribution conductors. The aircraft also comprises a set of electric generators, including a first electric generator G1$a$ and a second electric generator G2$a$. The first electric generator G1$a$ is connected to the distribution conductors B1$a$, B1$b$ of the first electrical distribution busbar B1 via a first coupling switch C1$a$, this first coupling switch being directly connected, on the one hand, to the first electric generator G1$a$ and, on the other hand, to the distribution conductors B1$a$, B1$b$ of the first busbar B1. The second electric generator G2$a$ is connected to the distribution conductors B2$a$, B2$b$ of the second electrical distribution busbar B2 via a second coupling switch C2$a$, this second coupling switch being directly connected, on the one hand, to the second electric generator G2$a$ and, on the other hand, to the distribution conductors B2$a$, B2$b$ of the second busbar B2. The first coupling switch C1a and the second coupling switch C2a are positioned in the aircraft independently of one another. The aircraft also comprises items of electrical equipment distributed through the fuselage 2 (which are not shown in FIG. 2). These items of electrical equipment are connected to the electrical conductors of the busbars B1 and B2 by means of local electrical connections. When the electrical network is of bipolar type, in one particular embodiment the electrical network is of the high-voltage direct current type and the electric generators in the set of electric generators are also of the high-voltage direct current type.

Given that the two coupling switches C1a and C2a are positioned in the aircraft independently of one another, these two switches do not form part of an electrical core of the aircraft. This makes it possible to arrange them freely in the aircraft. Moreover, each of the two switches being directly connected, on the one hand, to the corresponding electric generator and, on the other hand, to the corresponding electrical distribution busbar makes it possible for there to be electrical connections between the electric generators and the electrical distribution busbars via only these coupling switches, without these connections passing through other items of electrical equipment. This therefore makes it possible to minimize the lengths of the electrical connections, and therefore to minimize their weight and their bulk. Moreover, not requiring an electrical core in the aircraft also makes it possible to reduce the weight and the bulk of the electrical distribution network.

In one advantageous embodiment, the set of electric generators further comprises at least a first additional electric generator and this first additional electric generator is connected to the distribution conductors of the first electrical distribution busbar via a first additional coupling switch, this first additional coupling switch being directly connected, on the one hand, to the first additional electric generator and, on the other hand, to the distribution conductors of the first busbar. In the particular embodiment shown in FIG. 2, the set of electric generators comprises a first additional electric generator G1b and a second additional electric generator G2b. The first additional electric generator G1b is connected to the distribution conductors B1a, B1b of the first electrical distribution busbar B1 via a first additional coupling switch C1b. The second additional electric generator G2b is connected to the distribution conductors B2a, B2b of the second electrical distribution busbar B2 via a second additional coupling switch C2b. Like the first coupling switch C1a and the second coupling switch C2a, the first additional coupling switch C1b and the second additional coupling switch C2b are positioned in the aircraft independently of one another. Consequently, they are not installed in an electrical core of the aircraft, thereby making it possible to reduce the lengths of the electrical connections between, on the one hand, the additional generators G1b, G2b and, on the other hand, the respective electric power supply busbars B1, B2.

According to a first alternative, one out of the first electric generator G1a and the first additional electric generator G1b is current-controlled and the other out of the first electric generator and the first additional electric generator is voltage-controlled. Likewise, one out of the second electric generator G2a and the second additional electric generator G2b is current-controlled and the other out of the second electric generator and the second additional electric generator is voltage-controlled.

According to a second alternative, the first electric generator G1a and the first additional electric generator G1b are voltage-controlled. Likewise, the second electric generator G2a and the second additional electric generator G2b are voltage-controlled.

These two alternatives do not limit the invention and other alternatives relating to voltage and/or current control of the various generators are possible without departing from the scope of the invention.

In one advantageous embodiment, the first electrical distribution busbar B1 and the second electrical distribution busbar B2 have segregated paths through the fuselage 2 of the aircraft. This makes it possible to avoid the same electromagnetic interference or the same structural damage being able to simultaneously affect these two electrical distribution busbars.

Figure 3:
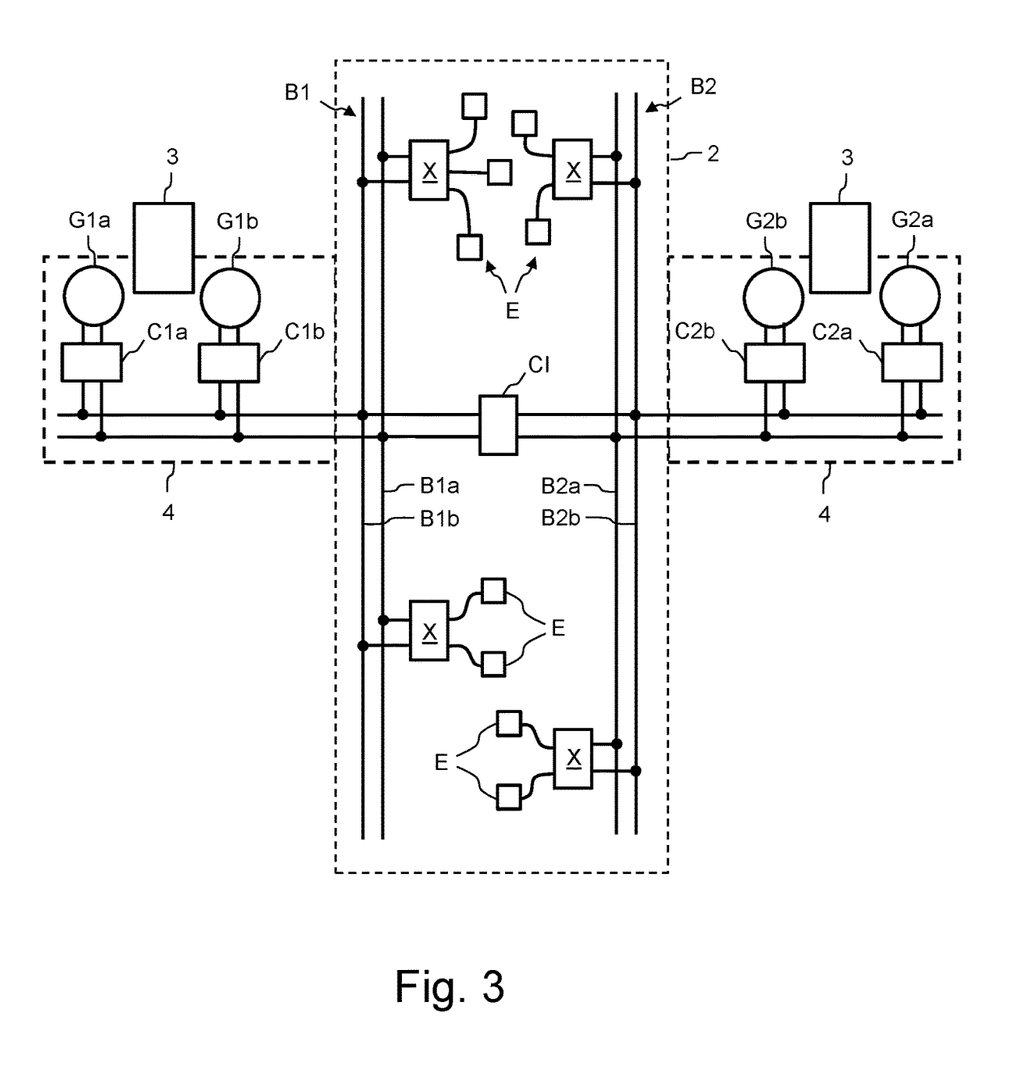
FIG. 3 schematically illustrates one embodiment of an electric power distribution network of an aircraft in accordance with one embodiment of the invention.

In one embodiment, two electric generators connected to the distribution conductors of the same electrical distribution busbar are driven by the same engine of the aircraft. Thus, in the example illustrated by FIG. 3, the first electric generator G1a and the first additional electric generator G1b, which are connected to the distribution conductors B1a, B1b of the first electrical distribution busbar B1, are driven by the same engine 3, which is, for example, located in a wing 4 on the port side of the aircraft. Likewise, the second electric generator G2a and the second additional electric generator G2b, which are connected to the distribution conductors B2a, B2b of the second electrical distribution busbar B2, are driven by the same engine 3, which is, for example, located in a wing 4 on the starboard side of the aircraft. The items of electrical equipment E distributed through the fuselage are connected to the electrical conductors of the electrical distribution busbars B1 and B2 by means of local electrical connections. Although not necessarily, as shown in FIG. 3, these items of electrical equipment E are connected to the electrical conductors of the electrical distribution busbars B1 and B2 by means of electrical connections connected to local junction boxes X, themselves connected to the electrical conductors of the electrical distribution busbars B1 and B2.

In one particular embodiment, the aircraft further comprises a connection between the first electrical distribution busbar B1 and the second electrical distribution busbar B2, via an interconnecting contactor CI. In normal operation, this switch CI is open, so that the two busbars B1 and B2 are independent of one another. In the event of a generator which supplies power to one of the two busbars failing, it is possible to control the interconnecting switch CI so as to close so as to connect the electrical distribution conductors of the two busbars B1 and B2 to one another in order to enable continuity of the power supply to the various items of electrical equipment distributed through the fuselage.

Figure 4:
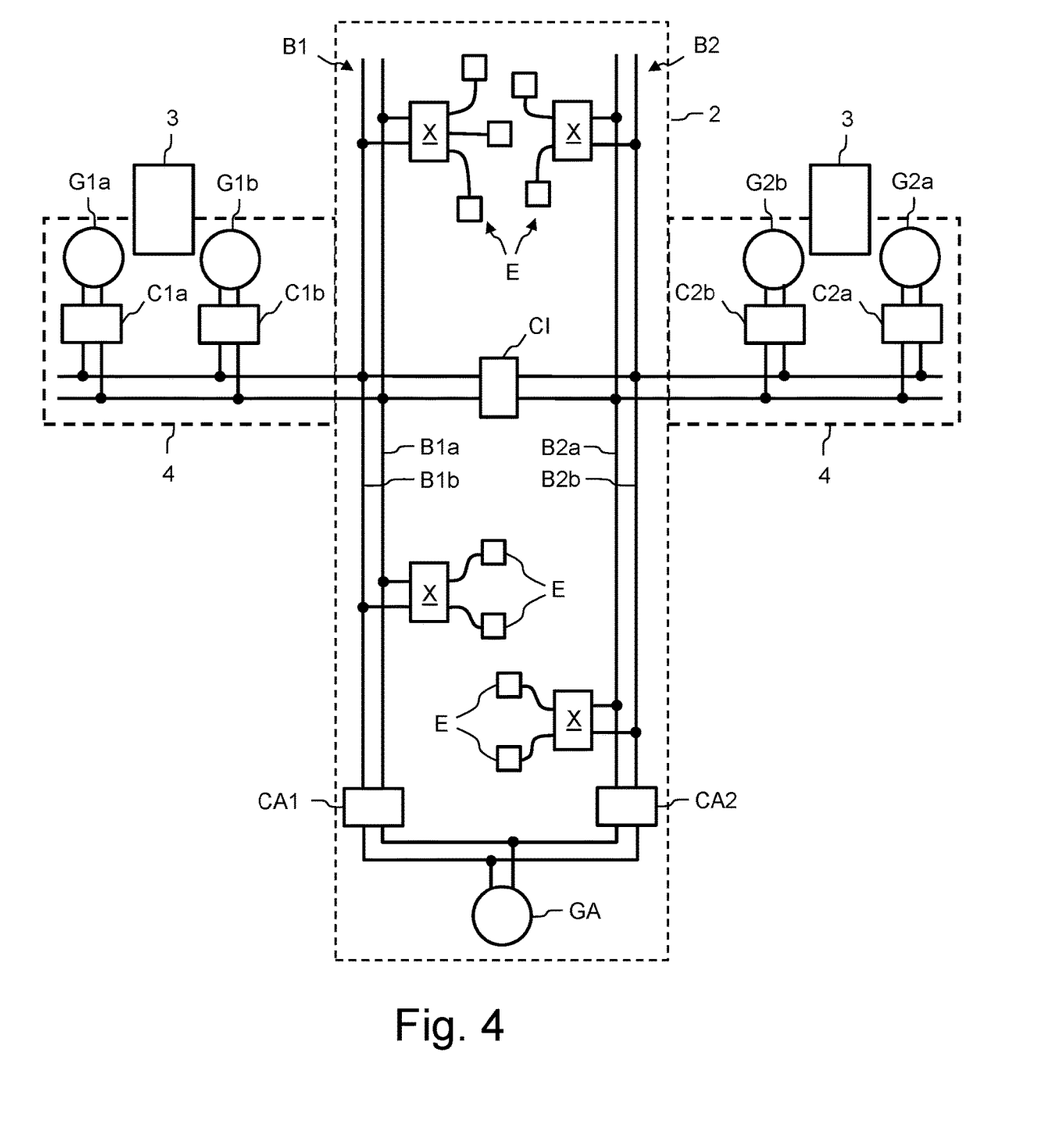
FIG. 4 schematically illustrates one embodiment of an electric power distribution network of an aircraft in accordance with one embodiment of the invention.

In one embodiment illustrated in FIG. 4, the aircraft further comprises at least one auxiliary electric generator GA driven by an auxiliary power unit (APU). This auxiliary electric generator GA is connected to at least one of the electrical distribution busbars via a coupling contactor which is independent of an electrical core of the aircraft. In the example illustrated in the figure, the auxiliary electric generator GA is connected to the electrical distribution conductors B1a, B1b of the first busbar B1 by means of a coupling contactor CA1 and it is also connected to the electrical distribution conductors B2a, B2b of the second busbar B2 by means of a coupling contactor CA2. The auxiliary electric generator makes it possible, in particular, to supply electricity to the items of electrical equipment E when the aircraft is on the ground with its engines 3 not running. As the contactors CA1 and CA2 are independent of an electrical core of the aircraft, the auxiliary electric generator GA is connected to the electrical distribution conductors of the electrical distribution busbars B1 and B2 without requiring connections in the fuselage 2 between this auxiliary electric generator GA and an electrical core of the aircraft. This is particularly advantageous, since the APU is generally located at the rear of the fuselage and an electrical core is generally located at the front of the fuselage. This embodiment thus makes it possible to avoid electrical connections extending over a large part of the length of the fuselage. Preferably, the contactors CA1 and CA2 are connected to the electrical distribution conductors of the busbars B1 and B2, respectively, in portions of the busbars located at the rear of the fuselage, thereby making it possible to minimize the lengths of the electrical connections between, on the one hand, the contactors CA1 and CA2 and, on the other hand, the electrical distribution conductors of the busbars B1 and B2, respectively.

Figure 5:
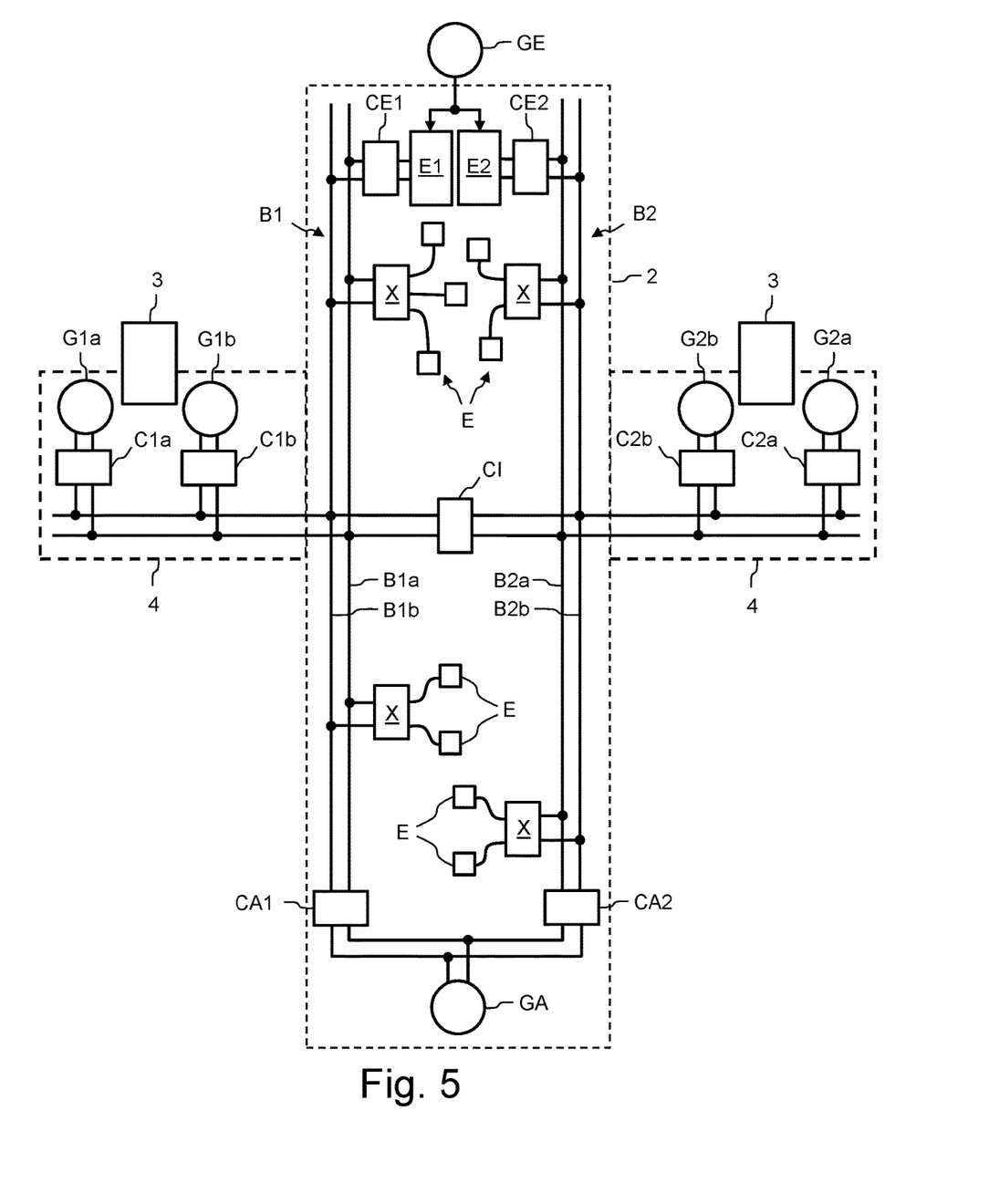
FIG. 5 schematically illustrates one embodiment of an electric power distribution network of an aircraft in accordance with one embodiment of the invention.

In one embodiment illustrated in FIG. 5, the aircraft further comprises at least one emergency electrical network supplied with power by an emergency electrical source GE. This at least one emergency electrical network is connected to at least one of the electrical distribution busbars via a coupling contactor. The emergency electrical source GE corresponds, for example, to an emergency wind turbine of RAT (ram air turbine) type or to a set of electric batteries. In the example illustrated in the figure, the emergency electrical network comprises two emergency electrical subnetworks E1 and E2 supplied with power by the emergency electrical source GE. These emergency electrical subnetworks comprise, for example, electric converters such as rectifiers, voltage converters, etc. The electrical subnetwork E1 is connected to the electrical distribution conductors B1a, B1b of the first electrical distribution busbar B1 via a coupling contactor CE1. The electrical subnetwork E2 is connected to the electrical distribution conductors B2a, B2b of the second electrical distribution busbar B2 via a coupling contactor CE2. The coupling contactors CE1 or CE2 are controlled so as to supply power to the electrical distribution busbars B1 or B2 from the emergency electrical source GE in the event of the engines 3 of the aircraft or the generators G1a, G1b, G2a or G2b failing.

Figure 6:
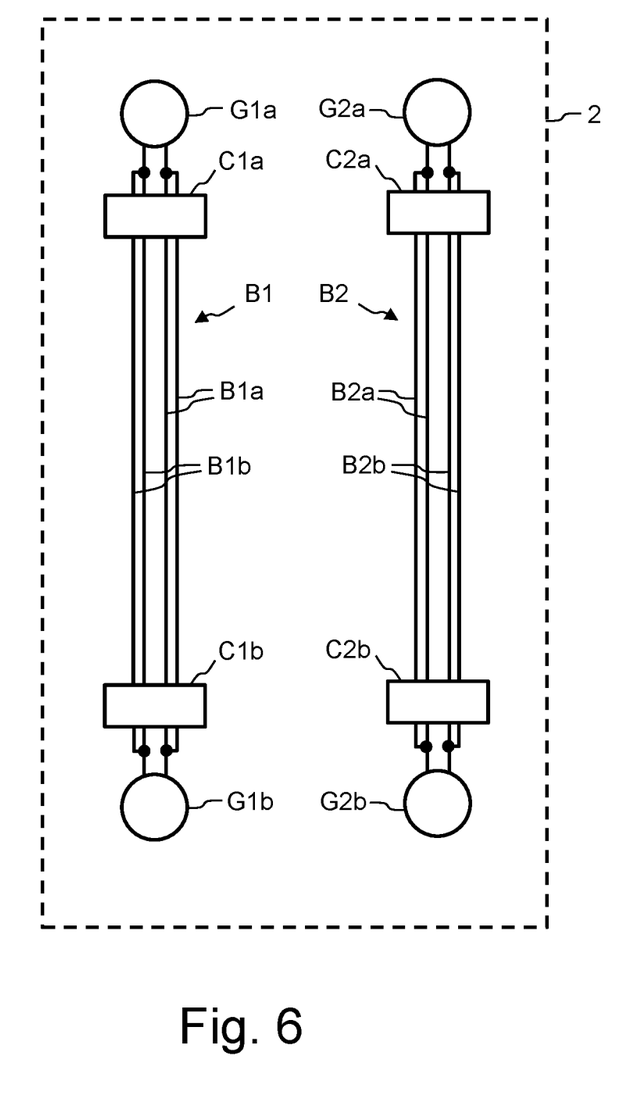
FIG. 6 schematically illustrates one embodiment of an electric power distribution network of an aircraft in accordance with one embodiment of the invention.

In one advantageous embodiment, the electrical distribution conductors of the various electrical distribution busbars are doubled. This is illustrated in FIG. 6, in the case of the electrical distribution network of FIG. 2. Doubling these electrical conductors makes it possible to protect them against the occurrence of series electric arcs. Specifically, for a series arc to be able to occur at a location where an electrical conductor is damaged, it is necessary for there to be a voltage greater than a minimum voltage value across the terminals of the damage. This minimum voltage value is of the order of 20 volts. Doubling the electrical distribution conductors makes it possible to shunt a damaged conductor. Consequently, the voltage across the terminals of the damage (between the two portions of the damaged conductor) thus remains less than this minimum voltage value and, as a result, a series electric arc cannot occur.

In one embodiment not shown in the figures, the set of electric generators further comprises a third electric generator and a fourth electric generator, and the set of electrical distribution busbars comprises a third electrical distribution busbar and a fourth electrical distribution busbar. The third electric generator is connected to the distribution conductors of the third electrical distribution busbar via a third coupling switch. This third coupling switch is directly connected, on the one hand, to the third electric generator and, on the other hand, to the distribution conductors of the third busbar. The fourth electric generator is connected to the distribution conductors of the fourth electrical distribution busbar via a fourth coupling switch. This fourth coupling switch is directly connected, on the one hand, to the fourth electric generator and, on the other hand, to the distribution conductors of the fourth busbar. The third coupling switch and the fourth coupling switch are positioned in the aircraft independently of one another. The aircraft thus has four electrical distribution busbars extending at least in part in a longitudinal direction of the fuselage 2. This makes it possible to reduce the number of items of electrical equipment E the electric power supply to which is affected in the event of a failure affecting one of the electrical distribution busbars. Preferably, the various busbars take segregated paths through the fuselage. For example, the first busbar takes a path through a lower portion of the port portion of the fuselage, the second busbar takes a path through a lower portion of the starboard portion of the fuselage, the third busbar takes a path through an upper portion of the port portion of the fuselage and the fourth busbar takes a path through an upper portion of the starboard portion of the fuselage.

The various previously described embodiments can be wholly or partially combined with one another, or indeed be taken independently of one another. In these various embodiments, the various electric generators are connected to the electrical distribution busbars via various coupling contactors. These various coupling contactors are arranged independently of an electrical core of the aircraft. Not needing an electrical core enables a saving in terms of weight and bulk. This also makes it possible to reduce the lengths of the electrical connections between the electric generators and the electrical distribution busbars and therefore to reduce the bulk and the weight of the electrical connections.

According to a first possibility, the coupling switch associated with an electric generator is positioned near the electric generator. Particularly, this coupling switch is integrated with the electric generator. This makes it possible to reduce the bulk of the assembly formed by the electric generator and the coupling switch.

According to another possibility, the coupling switch associated with an electric generator is positioned near the electrical distribution busbar to the conductors of which this electric generator is connected.

According to a first alternative illustrated in the various figures, two electric generators, G1a, G1b or G2a, G2b, respectively, associated with the same electrical distribution busbar, B1 or B2, respectively, are driven by the same engine 3 of the aircraft. This arrangement has the advantage of making it possible to adjust the idling speed of the engines 3 of the aircraft to a lower speed. Specifically, a situation should be avoided in which abnormally high electric power consumption on an electrical distribution busbar, for example because of a short circuit, could cause two engines 3 of the aircraft to stall simultaneously when they are idling. Specifically, the electric power consumption on an electrical distribution busbar increasing causes the electric power delivered by the one or more electric generators supplying power to this electrical distribution busbar to increase. As a result, the mechanical power which the one or more engines driving this or these electric generators must deliver increases. If this increase in the electric power consumption occurs at a moment when the engines are idling, this can cause a risk of the engines stalling. When two generators supplying power to the same busbar are driven by two distinct engines 3, this could cause a risk of two engines of the aircraft stalling simultaneously, which would not be acceptable, above all in the case of a twin-engine aircraft. To avoid such a risk of two engines of the aircraft stalling simultaneously, the idling speed of the engines must be adjusted to a sufficiently high speed so that the engines can drive the electric generators without stalling, even during a short circuit on an electrical distribution busbar. Thus, driving two generators connected to the same electrical distribution busbar using the same engine makes it possible to limit the risk of stalling to a single engine of the aircraft. Such a risk is considered to be acceptable for the operation of the aircraft, in so far as at least one other engine then remains operational, and consequently the idling speed of the engines can be adjusted to a lower speed.

According to another alternative, not shown in the figures, two electric generators, G1a, G1b or G2a, G2b, respectively, associated with the same electrical distribution busbar, B1 or B2, respectively, are driven by two distinct engines 3 of the aircraft. This arrangement has the advantage of enabling continuity of the electric power supply to the electrical distribution busbar in the event of an engine 3 of the aircraft failing.

In the context of the present description, the term "electric generator" is not limited to an electric generator per se, but it can further include items of current rectification and/or current or voltage conversion equipment associated with this electric generator. These items of equipment are located near the electric generator or physically integrated with the electric generator. In particular, in the case of an electrical network of high-voltage direct current, or HVDC, type, an electric generator includes an item of current rectification equipment.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:
a fuselage;
a set of items of electrical equipment distributed through the fuselage;
a set of electric generators including at least a first electric generator associated with an engine located at a wing of the aircraft and a second electric generator associated with an engine located at a wing of the aircraft; and
an electric power distribution network comprising a set of electrical distribution busbars including at least a first electrical distribution busbar and a second electrical distribution busbar, each of the electrical distribution busbars comprising electrical distribution conductors and extending at least in part in the fuselage, in a longitudinal direction of the fuselage,
wherein each of the items of electrical equipment in the set of items of electrical equipment is connected to the electrical distribution conductors of one busbar in the set of electrical distribution busbars,
wherein the first electric generator is connected to the distribution conductors of the first electrical distribution busbar via a first coupling switch, the first coupling switch being directly connected to the first electric generator and to the distribution conductors of the first busbar;
wherein the second electric generator is connected to the distribution conductors of the second electrical distribution busbar via a second coupling switch, the second coupling switch being directly connected to the second electric generator and to the distribution conductors of the second busbar; and
wherein the first coupling switch and the second coupling switch are positioned in the aircraft independently of one another.

2. The aircraft according to claim 1, wherein the first coupling switch and the second coupling switch are positioned in the aircraft independently of one another such that, for each of the first and second coupling switches, the respective switch is connected to the distribution conductors of the busbar in a portion of the busbar located in the fuselage near the wing at which the engine is located with which the generator corresponding to the switch is associated.

3. The aircraft according to claim 1, wherein the first coupling switch and the second coupling switch are positioned in the aircraft independently of one another such that, for each of the first and second coupling switches, when the busbar to which this switch is connected extends in the wing at which the engine is located with which the generator corresponding to the switch is associated, the switch is connected to the distribution conductors of the busbar in a portion of the busbar located near the generator.

4. The aircraft according to claim 1, wherein the set of electric generators further comprises a third electric generator and a fourth electric generator, and the set of electrical distribution busbars comprises a third electrical distribution busbar and a fourth electrical distribution busbar, such that:
the third electric generator is connected to the distribution conductors of the third electrical distribution busbar via a third coupling switch, the third coupling switch being directly connected to the third electric generator and to the distribution conductors of the third busbar;
the fourth electric generator is connected to the distribution conductors of the fourth electrical distribution busbar via a fourth coupling switch, the fourth coupling switch being directly connected to the fourth electric generator and to the distribution conductors of the fourth busbar; and
the third coupling switch and the fourth coupling switch are positioned in the aircraft independently of one another.

5. The aircraft according to claim 1, wherein the coupling switch associated with an electric generator is positioned near said electric generator.

6. The aircraft according to claim 1, wherein the coupling switch associated with an electric generator is integrated with said electric generator.

7. The aircraft according to claim 1, wherein the coupling switch associated with an electric generator is positioned near the electrical distribution busbar to the conductors of which this electric generator is connected.

8. The aircraft according to claim 1, wherein the set of electric generators further comprises at least a first additional electric generator and this first additional electric generator is connected to the distribution conductors of the first electrical distribution busbar via a first additional coupling switch, this first additional coupling switch being directly connected to the first additional electric generator and to the distribution conductors of the first busbar.

9. The aircraft according to claim 8, wherein one out of the first electric generator and the first additional electric generator is current-controlled and the other out of the first electric generator and the first additional electric generator is voltage-controlled.

10. The aircraft according to claim 8, wherein the first electric generator and the first additional electric generator are voltage-controlled.

11. The aircraft according to claim 1, wherein the electric generators in the set of electric generators are of the high-voltage direct current type.

12. The aircraft according to claim 1, wherein two electric generators connected to the distribution conductors of the same electrical distribution busbar are driven by the same engine of the aircraft.

13. The aircraft according to claim 1, wherein two electric generators connected to the distribution conductors of the same electrical distribution busbar are driven by distinct engines of the aircraft.

14. The aircraft according to claim 1, wherein the first electrical distribution busbar and the second electrical distribution busbar have segregated paths through the fuselage of the aircraft and further comprising a connection between the first electrical distribution busbar and the second electrical distribution busbar, via an interconnecting contactor.

15. The aircraft according to claim 1, further comprising at least one emergency electrical network supplied with power by an emergency electrical source and wherein the at least one emergency electrical network is connected to the electrical distribution conductors of at least one of the electrical distribution busbar via a coupling contactor.

16. The aircraft according to claim 1, further comprising an auxiliary electric generator of APU type and in that this auxiliary electric generator of APU type is connected to the electrical distribution conductors of at least one of the electrical distribution busbars via a coupling contactor.

17. The aircraft according to claim 1, wherein the electrical distribution conductors of the various electrical distribution busbars are doubled so as to protect these electrical conductors against an occurrence of series electric arcs.

* * * * *